2,840,587

PROCESS FOR PRODUCING ETHIONINE AND ITS SALTS

Frederick H. Norton, Concord, Calif., assignor to The Dow Chemical Company, Midland, Mich., a corporation of Delaware No Drawing. Application July 7, 1954
Serial No. 441,943

3 Claims. (Cl. 260—429.9)

This invention relates to an improved method for the preparation of ethionine,

$C_2H_5$—S—$CH_2CH_2CH(NH_2)COOH$ and its salts.

The commercial processes for making methionine, the methyl homologue of ethionine, generally involve the initial preparation and isolation, as by distillation, of beta-methyl-mercaptopropionaldehyde, which is then converted to 5(2-methylmercaptoethyl) hydantoin, and the latter is hydrolyzed to yield methionine. When the same procedures are applied to the preparation of ethionine, the process is not as economical as might be desired, as the distillation of the beta-ethylmercaptopropionaldehyde from the reaction product of the first step is accompanied by considerable polymerization of the aldehyde and there is a consequent loss in yield of the products in the succeeding steps. In the usual methionine process mentioned above, the alkaline hydrolysis of the hydantoin compound gives a salt of methionine which is highly soluble in the reaction medium, and from which it is difficult to recover methionine in pure form. Accordingly, an extra step has been introduced which converts the methionine salt to methionine without forming any soluble salts to act as possible contaminants.

It is among the objects of the present invention to provide a method for the preparation of ethionine which avoids the irrevocable loss of aldehyde values due to polymerization and handling of the beta-ethylmercaptopropionaldehyde intermediate. Another object is to provide such a process from which substantially pure ethionine, or a substantially pure salt of ethionine, may be recovered.

According to the present invention, the foregoing and related objects are attained by reacting approximately equal volumes of ethyl mercaptan and acrolein, under conditions to be described more fully, to form beta-ethylmercaptopropionaldehyde and, without isolating or purifying the aldehyde, converting it to 5(2-ethylmercaptoethyl) hydantoin and hydrolysing the latter in alkaline medium to form an alkaline solution of ethionine. The ethionine may be recovered in purity generally over 95 percent by careful acidification and crystallization, but is preferably isolated in the form of its zinc salt, by precipitation from the crude reaction mixture under closely controlled pH conditions.

The initial reaction, to form beta-ethylmercaptopropionaldehyde, takes place between ethyl mercaptan and about an equal volume, i. e., about 10 to 15 percent molar excess, of acrolein. The latter should be of good quality, and it is preferred to use freshly distilled acrolein. The reaction is initiated or catalysed by the introduction of an organic peroxide, such as diacetyl peroxide, or by any of several salts, such as mercuric chloride, known to be catalysts for this type of reaction. The reaction is exothermic, and the mixture is stirred in a closed pressure vessel with cooling if needed, to keep the temperature of the mixture at or below 55° C. It is most convenient to initiate the reaction with small amounts of the reagents and catalyst, and then to introduce additional amounts of these materials in the same ratio at a combined rate such that the heat of reaction does not raise the temperature of the mixture above about 55° C. The beta-ethylmercaptopropionaldehyde formed by the initial reaction serves as the reaction medium for the subsequently introduced portions of mercaptan and acrolein, and, once started, there is no induction period before later added portions of the reagents will react. In effect, then, the reaction is carried out in a medium consisting essentially of the desired intermediate product, beta-ethylmercaptopropionaldehyde.

The beta-ethylmercaptopropionaldehyde, without intervening chemical or physical treatment intended to effect purification, is stirred into a cold aqueous solution (20° C. or lower) of a slight molecular excess of an alkali metal cyanide and of ammonium bicarbonate. The reaction vessel is sealed and the mixture is warmed to a temperature from 50° to 90° C., preferably near 75° C. and held at such temperature until there is no further increase in pressure. The pressure is released, to void the volatile impurities, and the aqueous solution of 5(2-ethylmercaptoethyl) hydantoin is ready for the hydrolysis reaction to convert the hydantoin to ethionine.

To the aqueous solution of the crude hydantoin, at a temperature at or below 70° C. is added from 1.1 to 2 times the theoretical amount of alkali. It has been found convenient and effective to use a solution of 3 mols of an alkali metal hydroxide for each mol of ethyl mercaptan originally employed. This is a 50 percent excess over maximum theoretical requirement. The vessel is sealed again and heated rapidly to about 165°–170° C. and held at such temperature for a few minutes, e. g., half an hour. The pressure is released while the mixture is not and ammonia and other volatile impurities are vented to waste lines. The solution remaining in the vessel contains the ethionine as an alkali metal salt, and, while hot, the solution is decolorized with charcoal and filtered, to give a clear solution of crude ethionine.

This solution may be neutralized with hydrochloric acid, or other mineral acid, while hot, and will deposit ethionine crystals on standing. The so-recovered ethionine, when washed with methanol and dried at 110°–150° C., is generally of at least 95 percent purity. The chief impurity is sodium chloride.

It is preferred to recover the ethionine in greater purity and free from alkali metal salts. To this end, the crude ethionine solution, after being decolorized, is acidified to pH below 6, heated to boiling, and an aqueous solution of zinc chloride, preferably in stoichiometric amount, is added to convert the ethionine present to zinc ethionate. The hot solution is stirred and then adjusted to a pH between 6 and 7 by addition of sodium hydroxide, whereupon the zinc ethionate precipitates out and may be recovered by filtration. When the precipitate is washed with hot water and dried, it has a purity ranging from 98 to 100 percent, depending on the care with which the amount of added zinc chloride was controlled and the care with which the pH was adjusted to effect precipitation.

The following specific example illustrates the practice of the invention:

There was set aside for use in the reaction 1920 ml. each of ethyl mercaptan (1630 g.; 26.3 mols) and of distilled acrolein (1630 g.; 29.2 mols; about 11 percent excess). The catalyst used was diacetyl peroxide, in amount of about 0.3 to 0.4 percent of the combined weights of mercaptan and acrolein. The peroxide was supplied as an 18 percent solution in dimethyl phthalate, and 70 ml. of this solution, or about 1.8 percent of the combined volumes of mercaptan and acrolein, was used. Reaction was initiated by mixing about 100 ml. each of ethyl mercaptan and acrolein with about 3.6 ml. of the peroxide solution in a closed vessel, stirring and heating at about 40° C. until the temperature rose spontaneously due to heat of reaction. Thereafter, the balance of each of the reagents and catalyst was added to the initially formed beta-ethylmercaptopropionaldehyde in the same ratios and over a period of nearly 3 hours. The reacting mixture was stirred and the reagents were added at a rate to prevent the heat of reaction from carrying the temperature as high as 55° C. When the last portions of reagents had been added and the temperature subsided, there remained in the vessel 3250 grams of crude beta-ethylmercaptopropionaldehyde. The product undoubtedly contained the dimethylphthalate which was introduced with the catalyst, and it probably contained some polymerized acrolein, but it was shown to be essentially free from unreacted ethyl mercaptan and monomeric acrolein, since only about 1 percent of a test sample was volatile up to 100° C.

The untreated, crude beta-ethylmercaptopropionaldehyde was cooled to 17° C. and added to a solution of 1350 grams of sodium cyanide (27.6 mols) and 4560 grams of ammonium bicarbonate (about 58 mols) in 33.6 kilos of water. The resulting mixture was heated to 75° C. in a closed vessel and held at that temperature for two hours. The vessel was then vented to a waste line and gaseous products were allowed to escape. There remained in the vessel a slightly alkaline solution of 5(2-ethylmercaptoethyl) hydantoin, which was used in the next step without isolation or purification.

The hydantoin solution, at about 65° C., was made strongly alkaline by the addition of 72 mols of sodium hydroxide supplied as 5750 grams of a 50 percent aqueous solution. The alkaline mixture was heated rapidly in a closed vessel to 165°–170° C. The resulting pressure was 135 to 145 pounds per square inch gauge. These conditions were maintained for 30 minutes, and the pressure was then released by venting the top of the vessel to a waste line. The escaping steam, ammonia and other volatiles cooled and concentrated the residual solution. When atmospheric pressure was reached and active evolution of gas and vapors had virtually stopped, the still hot solution was stirred with 250 grams of decolorizing charcoal and filtered. The filtrate had a volume of 33 liters and weighed 37.9 kilograms. Analysis of a sample showed the whole solution to contain 3060 grams (18.77 mols) of ethionine.

A 500 gram sample of the alkaline ethionine solution, 0.242 mol of ethionine, was neutralized (to pH 7) by the careful addition of concentrated hydrochloric acid, of which 71 ml. was required. The neutral solution was allowed to stand overnight. A crop of crystals was then recovered by filtration. The crystals were washed with 100 ml. of cold methanol and dried in a vacuum oven at 140° C. The crystals weighed 32.4 grams and had a purity of 96.5 percent ethionine. The over-all yield of this quality ethionine is about 58 percent, based on the initial mercaptan. Further concentration of the mother liquor gives additional small crops of ethionine, but of much lower quality.

A preferred method of recovering the ethionine was carried out on other portions of the decolorized alkaline ethionine solution. Thus, a 575 gram sample, containing 45.7 grams, or 0.28 mol, of ethionine was acidified to pH 4 with hydrochloric acid, and the acid solution was heated to boiling. There was then added 29.7 grams (0.21 mol) of zinc chloride. The hot solution was stirred and adjusted to pH 6.2 by the addition of sodium hydroxide. Zinc ethionate precipitated and was removed by filtration, washed with a liter of hot water, and dried in a vacuum oven at 110° C. The product, of at least 98 percent purity, weighed 43.2 grams and contained 0.108 mol of ethionine. Analysis showed it to contain 17.15 percent of zinc (theory=16.8 percent). Recovery of ethionine from solution, by this procedure, was 77 percent. Further recovery can be had by returning the undiluted filtrate to the next batch of ethionine to be treated.

In other samples, the amount of zinc chloride used was reduced to the stoichiometric ratio to the ethionine present, with a consequent improvement in the quality of the zinc ethionate to values over 99 percent, and with no significant change in yield. Thus, in a repeat of the specific example above, when 0.14 mol of zinc chloride was used, instead of 0.21 mol, a 99 percent product was obtained.

Numerous repetitions of the process have shown it to yield from 55 to 65 percent of the theoretical amount of ethionine, or of its zinc salt, based on the amount of ethyl mercaptan used in the initial reaction. When, however, the crude beta-ethylmercaptopropionaldehyde is subjected to attempted purification by distillation, as is done successfully with the methyl homologue in making methionine, the ultimate yield of ethionine on the same basis is near 45 to 50 percent.

I claim:

1. In a method for making ethionine from ethyl mercaptan and acrolein, through the sequential formation of beta-ethyl mercaptopropionaldehyde and 5(2-ethylmercaptoethyl) hydantoin, the improvement which consists in making the hydantoin directly from the crude unpurified beta-ethylmercaptopropionaldehyde.

2. The improvement claimed in claim 1, wherein the solution in which the crude hydantoin is made is used directly to make ethionine.

3. The improvement claimed in claim 2, wherein ethionine is recovered as zinc ethionate, by acidification of the crude ethionine solution to a pH below 6, addition of at least a stoichiometric amount of a water-soluble zinc salt, and adjustment of the solution to a pH in the range from 6 to 7.

References Cited in the file of this patent

UNITED STATES PATENTS

| | | |
|---|---|---|
| 2,521,677 | Week | Sept. 12, 1950 |
| 2,523,633 | Piersen et al. | Sept. 26, 1950 |
| 2,527,366 | Livak et al. | Oct. 24, 1950 |
| 2,557,913 | Livak et al. | June 19, 1951 |
| 2,626,282 | Cunningham et al. | Jan. 20, 1954 |
| 2,676,190 | Bernard et al. | Apr. 20, 1954 |

OTHER REFERENCES

Catch et al.: Nature, vol. 159, pages 578, 579 (Apr. 26, 1947).

Catch et al.: Jour. Chem. Soc., 1947, pages 1609–1613.